United States Patent [19]
Finkelmann et al.

[11] 4,388,453
[45] Jun. 14, 1983

[54] CROSSLINKED ORGANOPOLYSILOXANES HAVING LIQUID-CRYSTALLINE PROPERTIES

[75] Inventors: Heino Finkelmann; Günther Rehage, both of Clausthal-Zellerfeld; Franz-Heinrich Kreuzer, Martinsried, all of Fed. Rep. of Germany

[73] Assignee: Consortium für Elektrochemische, Munich, Fed. Rep. of Germany

[21] Appl. No.: 375,152

[22] Filed: May 5, 1982

[30] Foreign Application Priority Data

May 15, 1981 [DE] Fed. Rep. of Germany ....... 3119459

[51] Int. Cl.$^3$ ............................................. C08G 77/06

[52] U.S. Cl. .................. 528/15; 252/299.01; 252/299.4; 252/299.6; 252/299.67; 252/299.7; 528/31; 528/32; 528/26; 528/27; 528/29; 528/30

[58] Field of Search ....................... 528/15, 31, 32, 26, 528/27, 29, 30, 41; 252/299.01, 299.4, 299.6, 299.67, 299.7

[56] References Cited

U.S. PATENT DOCUMENTS 4,358,391 11/1982 Finkelmann et al. ................. 528/26

Primary Examiner—Melvyn I. Marquis

[57] ABSTRACT

This invention relates to crosslinked organopolysiloxanes having liquid-crystalline properties in which mesogenic molecules are chemically bonded to the organopolysiloxane lattices. These crosslinked organopolysiloxanes are prepared from silanes or siloxanes containing mesogenic molecules which are capable of being crosslinked by addition or condensation reactions.

4 Claims, No Drawings

CROSSLINKED ORGANOPOLYSILOXANES HAVING LIQUID-CRYSTALLINE PROPERTIES

The present invention relates to organopolysiloxanes having liquid-crystalline properties and more particularly to crosslinked organopolysiloxanes having liquid crystalline properties and to a process for preparing the same.

BACKGROUND OF THE INVENTION

Organopolysiloxanes having liquid-crystalline properties have been described in German Patent Disclosure No. 2,944,591. These organopolysiloxanes having mesogenic molecules chemically bonded thereto as side chains are obtained by grafting vinyl-substituted mesogenic molecules to an organohydrogenpolysiloxane.

Therefore, it is an object of this invention to provide three-dimensional systems which have liquid crystalline properties. Another object of this invention is to provide three-dimensional crosslinked systems having liquid-crystalline properties. Still another object of the present invention is to provide three-dimensional crosslinked, non-liquid systems having liquid-crystalline properties. A further object of the present invention is to provide systems having typical solid characteristics such as deformability and flow behavior, but have liquid-crystalline properties characteristic of normal liquid crystals.

SUMMARY OF THE INVENTION

The foregoing objects and others which will become apparent from the following description are accomplished in accordance with this invention, generally speaking, by providing three-dimensional, crosslinked organopolysiloxanes having liquid-crystalline properties in which the same or different mesogenic molecules are chemically bonded to the organopolysiloxane molecule. The organopolysiloxanes having liquid-crystalline properties may be crosslinked by means of free radicals, addition reactions or condensation reactions to form crosslinked organopolysiloxanes having nematic, chiral nematic or smectic properties.

DETAILED DESCRIPTION OF THE INVENTION

Organopolysiloxanes having liquid-crystalline properties which are included in this invention are elastomers having a relatively low degree of crosslinking and resins which have a high degree of crosslinking.

The organopolysiloxanes of this invention which have liquid-crystalline properties can be crosslinked by conventional systems which are known for crosslinking organopolysiloxanes.

Systems which may be employed for crosslinking organopolysiloxanes containing mesogenic groups are those which utilize free radicals and contain no functional groups or no functional groups other than alkenyl groups prior to crosslinking. Such systems are available for crosslinking organopolysiloxane chains having mesogenic molecules grafted thereto, in the presence of substances which form free radicals such as organic peroxides and the like. If the organopolysiloxane chains having grafted mesogenic molecules contain from 1 to 4 mole percent of aliphatic multiple bonds, for example 1 to 4 mole percent of vinyl groups, the crosslinking can also be accomplished by elemental sulfur.

Preferred systems which may be used in this invention for crosslinking are the addition reactions in which an Si-H functional group is added to an aliphatic multiple bond in the presence of catalysts which promote such reactions.

A particularly preferred system which may be employed is the reaction of an organohydrogenpolysiloxane with a mixture of mesogenic molecules having vinyl or acetylenic groups and an organopolysiloxane having at least two vinyl groups as the crosslinking agent, with the mixture having from 0.2 to 2 times, and more preferably a stoichiometric number of vinyl or acetylenic groups based on the number of Si-bonded hydrogen groups in the presence of a catalyst which promotes the addition of Si-bonded hydrogen to the vinyl or acetylenic functional group.

Preferably, the organohydrogenpolysiloxane is a polymethylhydrogensiloxane having terminal trimethyl or dimethylsiloxy groups. The number of Si-bonded hydrogen groups preferably should not exceed the number of silicon atoms present on the chain.

Dimethylpolysiloxanes having one vinyl group in each terminal unit is generally used as the crosslinking agent. The proportion of crosslinking agent based on the vinyl content of the mixture is generally from about 5 to 50 mole percent and more preferably from about 10 to 20 mole percent.

Compounds of platinum, ruthenium, rhodium or palladium, which were used heretofore as catalysts for such reactions may be used as catalysts in this invention. Examples of preferred platinum compounds and complexes are $PtCl_2$, $H_2PtCl_6.6\ H_2O$, $Na_2PtCl_4.4\ H_2O$, Pt-olefin complexes, Pt-alcohol complexes, Pt-ether complexes and others.

Numerous variations can be made within the specified addition crosslinking system. For example, either the component carrying the Si-bonded hydrogen functional group or the component carrying the vinyl group or both components of which the addition system is composed can have chemically bonded mesogenic molecules.

The crosslinked siloxanes prepared in accordance with this invention having liquid-crystalline properties may be further modified by using bifunctional substances such as allyl acrylate or methacrylate or allyl epoxypropyl ether as the crosslinking agent. The synthesis of such crosslinked organopolysiloxanes having chemically bonded mesogenic molecules is best accomplished by reacting organohydrogenpolysiloxanes with grafted mesogenic molecules, which are prepared from the condensation of silanes modified with mesogenic molecules or by the equilibration of appropriate siloxanes or by the addition of the aforementioned bifunctional systems in the presence of a platinum catalyst to produce an addition product which is then crosslinked by the addition of radical-formers or high-energy radiation such as UV radiation, or in the case of epoxy derivatives, with acid anhydrides or amines.

Another useful crosslinking system whereby thioether groups are formed as points of crosslinking, is an addition system available from the photochemical reaction of mercaptofunctional silanes or siloxanes with organopolysiloxane having aliphatic multiple bonds. For example, an organopolysiloxane grafted with mesogenic molecules and having an allyl group in each terminal unit is crosslinked with an organopolysiloxane having methylmercaptopropylsiloxane units and end-blocked with trimethylsiloxy groups, in the presence of UV radiation.

Systems which utilize the condensation reactions are the preferred crosslinking systems. Such crosslinked systems are obtained from the condensation of an organopolysiloxane having a condensable group in each terminal unit with a silane containing at least three condensable groups or partial hydrolyzates of such silanes containing at least three condensable groups. Examples of condensable groups are hydrogen, hydroxyl, alkoxy, acyloxy, aminoxy, amino, acylamino, oxime or phosphate groups bonded to silicon atoms. The mesogenic molecules can be chemically bonded to either of the two components or to both components.

The condensation reactions are carried out in the presence of well-known condensation catalysts. Examples of such catalysts are particularly compounds of tin, such as dibutyltin dilaurate, dibutyltin diacetate and others.

The siloxane lattices prepared in accordance with this invention having liquid crystalline properties are particularly methylpolysiloxanes having chemically bonded mesogenic molecules. Other examples of substituents linked through Si-C bonding are ethyl, propyl, and phenyl radicals. The specified groups are introduced by an appropriate selection of the starting compounds.

Basically all compounds having mesogenic properties are useful as mesogenic molecules.

Functional groups exhibiting mesogenic properties have previously been described in the literature; for example, by Dietrich Demus et al, "Liquid Crystals in Tables", VEB Deutscher Verlag fur Grundstoffindustrie, Leipzig, 1974.

Examples of such derivatives of cyclohexane are phenyl cyclohexane carboxylate, cyclohexylphenyl cyclohexane carboxylate, cyclohexylphenyl ether, cyclohexylbenzenes, cyclohexyl cyclohexane carboxylate, dicyclohexyl derivatives, derivatives of stilbene, derivatives of phenyl benzoate, benzylidene anilines, derivatives of azobenzene, derivatives of azoxybenzene, alkyl and alkoxy derivatives of biphenyl, Schiff bases, steroids such as derivatives of cholesterol and cholestane.

Oftentimes, it is preferred that the mesogenic functional groups contain polar groups such as the nitrile group, for example, in order to obtain a high dielectric anisotropy effect.

Preferably, flexible bonding should exist between the actual mesogenic function and the organopolysiloxane backbone. This is best achieved with from 3 to 6 methylene or dimethylsiloxy groups as a bonding element between the siloxane backbone and the actual mesogenic function.

The grafting reaction of mesogenic molecules to the siloxane or organopolysiloxane backbone is most favorably accomplished by the addition of an Si-H function to an aliphatic multiple bond. Preferably, mesogenic molecules are used which have vinyl or acetylenic groups, particularly derivatives of the above mentioned mesogenic functions of propene, butene, pentene, hexene, butyne, pentyne and hexyne.

The procedure for the preparation of the crosslinked siloxanes having liquid-crystalline properties pursuant to this invention is accomplished by the aforementioned methods of crosslinking.

A preferred procedure for preparing the crosslinked siloxanes is to react an organohydrogenpolysiloxane with a mixture of vinyl-substituted mesogenic molecules and an organopolysiloxane having a vinyl group in each terminal group, with the mixture having an approximte stoichiometric number of vinyl groups based on the number of Si-H functions present in the reaction mixture, in the presence of a catalyst which promotes the addition of Si-H to aliphatic multiple bonds.

This procedure is particularly suitable for producing elastomers having liquid-crystalline properties in accordance with this invention.

Another preferred procedure for preparing crosslinked organopolysiloxanes having liquid-crystalline properties is to react silanes or mixtures of silanes of the general formula

$$R_n SiR'_{4-n}$$

where R is a mesogenic molecule, R' is a condensable group, and n represents 0, 1, 2 or 3 in the presence of a condensation catalyst, with the proviso that in at least a portion of these silanes, n is equal to at least 1 and in another portion n is 0 or 1.

Preferably, the fraction of silanes in which n is at least equal to 1 and therefore having at least one mesogenic functional group, is at least 50 mole percent. The fraction of crosslinking silanes free of the mesogenic function is therefore a maximum of 50 mole percent.

The pressure and temperature conditions which may be used for the specified procedure are within the typical range found to be suitable in the past for the particular crosslinking reaction.

In the elastomers prepared in accordance with this invention having liquid-crystalline properties, the phase transition is generally in the range of the phase transition of the uncrosslinked organopolysiloxanes having liquid-crystalline phases from which the lattices are derived. As the degree of crosslinking increases, particularly in the case of the resinous species, the liquid-crystalline structure is fixed. The transition into the isotropic state in such cases is generally above the temperature of decomposition of the siloxane. In order to produce a liquid-crystalline state having as uniform a structure as possible, especially in the case of the resins prepared in accordance with the invention, it is therefore preferred that the orientation of the mesogenic functions be measured either before or during the crosslinking. Suitable measures for this purpose are milling, spreading, application of electrical fields, and the like.

The crosslinked siloxanes prepared in accordance with this invention having liquid-crystalline properties can be used as temperature indicators. Such applications arise, for example, in the field of medicine, non-destructive materials testing (Heat flow procedure), or in the solution of testing problems in microelectronics. An important field of application has opened up in the optical display of electrical and magnetic fields (optoelectronics). Other possible applications may be in the field of electrographic procedures, light modulation or for example in their use as a component of polarizing films. The organopolysiloxanes prepared in accordance with this invention are particularly suitable for the coating of films.

The invention is further described in the following examples in which all percentages are by weight.

EXAMPLE 1

Preparation of an elastomer having liquid-crystalline phases.

A 50 percent toluene solution is prepared by mixing:
(a) 1 mole of a 1:1 copolymer of methylhydrogenpolysiloxane and dimethylpolysiloxane having 120 siloxy units in the chain and end-blocked with trimethylsiloxy groups with
(b) 0.45 mole of 4'-methoxyphenyl-4-propene-2-oxybenzoate and
(c) 0.05 mole of a dimethylpolysiloxane having a chain length of 9 dimethylsiloxy units and having a vinyl group in each terminal unit.

About 10 ppm of a platinum catalyst which is obtained from the reaction of hexachloroplatinic acid with n-decene is added to the solution and then allowed to crosslink at 60° C. until the Si-H absorption band at 2,080 cm$^{-1}$ disappears.

The resultant crosslinked polymer is extracted with toluene for 2 days, then treated with methanol to reduce its swollen condition, and finally dried under vacuum.

The resultant product is studied with a polarizing microscope and by differential scanning calorimetry (DSC) for liquid-crystalline properties. The results are shown in Table 1.

TABLE 1

| Glass Temperature | Nematic Phase | Isotropic Phase |
|---|---|---|
| °K. | °K. | °K. |
| 264 | 264–285 | 285 and above |

The enthalpy of transition from the nematic into the isotropic state is 0.82/g.

EXAMPLE 2

The method described in Example 1 is repeated, except that the amount of mesogenic compound (b) is 0.4 mole instead of 0.45 mole and the amount of crosslinking agent (c) is 0.1 mole instead of 0.05 mole. The results are shown in Table 2.

TABLE 2

| Glass Temperature | Nematic Phase | Isotropic Phase |
|---|---|---|
| °K. | °K. | °K. |
| 263 | 263–283 | 283 and above |

The enthalpy of transition from the pneumatic to the isotropic state is 0.40 J/g.

EXAMPLE 3

The method described in Example 1 is repeated, except that 0.4 mole of a mixture containing 89 mole percent of 4'-methoxyphenyl-4-propene-2-oxybenzoate and 11 mole percent cholesteryl allyl carbonate is substituted for the mesogenic component (b). The results are shown in Table 3.

TABLE 3

| Glass Temperature | Chiral Nematic Phase | Isotropic Phase |
|---|---|---|
| °K. | °K. | °K. |
| 261 | 261–308 | 308 and above |

EXAMPLE 4

Preparation of a resin having liquid-crystalline phases.

(a) A mixture containing 10 g of cholesteryl 4-propene-2-oxybenzoate, 1.9 g of trichlorosilane, 36 g of methylene chloride and 100 ppm by weight of Pt, based on the weight of the solution, in the form of dicyclopentadienyl-PtCl$_2$ is refluxed for 3 hours. About 4 ml of methanol is then added and refluxed for an additional 2 hours. The solvent is then removed under vacuum. The resultant product which is identified as (I) has a clarification temperature of 181° C.

(b) In a manner similar to (a), 10 g of 4'-phenylphenyl-propene-2-oxybenzoate is reacted with 4.1 g of trichlorosilane in the presence of 100 ppm of platinum catalyst. After the addition of 6 ml of methanol and the removal of the solvent, the resultant product which is identified as II has a clarification temperature of 54° C.

(c) A mixture containing products I and II in a weight ratio of 1:1, is treated with 4 percent by weight of dibutyltin diacetate, based on the weight of the mixture.

The mixture is milled on a rubber mill at 60° C. onto a film of cellulose acetate. The rolling process orients the mesogenic functional groups into a liquid-crystalline state having a uniform reflecting chiral nematic structure. A cholesteric phase is developed having a yellow-green reflected color. The temperature is then raised to 120° over a period of one hour. After heating for an additional 2 hours at 120°, the reflected color has shifted towards the blue-green. The film is no longer soluble in toluene. The transition into the isotropic state is above the decomposition temperature of the resin.

EXAMPLE 5

The method described in Example 1 is repeated, except that 1 mole of trimethylsiloxy end-blocked methylhydrogenpolysiloxane having a chain length corresponding to 120 siloxy units is substituted for the organopolysiloxane (a). The results are shown in Table 4.

TABLE 4

| Glass Temperature | Nematic Phase | Isotropic Phase |
|---|---|---|
| °K. | °K. | °K. |
| 273 | 273–335 | 335 and above |

The enthalpy of transition from the nematic into the isotropic state is 0.82 J/g.

EXAMPLE 6

The method described in Example 2 is repeated except that 0.4 mole of 4'-methoxyphenyl 4-hexene-2-oxybenzoate is used as the mesogenic compound (b).

The crosslinked polymer is extracted with toluene in accordance with Example 1 and then treated with methanol to shrink the crosslinked material. This method is used merely to demonstrate that the crosslinked material actually has liquid-crystalline properties. The results are shown in Table 5.

TABLE 5

| Glass Temperature | Smectic Phase | Isotropic Phase |
|---|---|---|
| °K. | °K. | °K. |
| 253 | 253–332 | 332 |

The enthalpy of transition into the istropic state is 0.95 J/g.

What is claimed is:
1. Three dimensional crosslinked organopolysiloxanes having liquid-crystalline properties which have mesogenic molecules chemically bonded to the organopolysiloxane lattice.
2. The organopolysiloxanes of claim 1, wherein the organopolysiloxanes have nematic or chiral nematic properties.

3. A process for preparing the crosslinked organopolysiloxanes of claims 1 or 2, wherein an organohydrogenopolysiloxane is reacted with a mixture containing vinyl-substituted mesogenic molecules and an organopolysiloxane having a vinyl group in each terminal unit, in which at least a stoichiometric number of vinyl groups and Si-H groups are present in the reaction mixture, in the presence of a catalyst capable of promoting the addition of Si-H to aliphatic multiple bonds.

4. The process for preparing the organopolysiloxanes of claims 1 or 2, wherein silanes or mixtures of silanes having the general formula $$R_n SiR'_{4-n}$$

wherein R is a mesogenic molecule, R' is a condensable group, and n stands for 0, 1, 2 or 3, are allowed to crosslink in the presence of a condensation catalyst, with the proviso that in at least a portion of these silanes n is at least equal to 1 and in another portion n is 0 or 1.

* * * * *